United States Patent [11] 3,545,820

[72] Inventors Daniel G. Scott
Apollo;
Fred Temple, Pittsburgh, Pa.
[21] Appl. No. 788,239
[22] Filed Dec. 31, 1968
[45] Patented Dec. 8, 1970
[73] Assignee Westinghouse Air Brake Company
Wilmerding, Pa.
a corporation of Pennsylvania

[54] BRAKE CONTROL VALVE
8 Claims, 1 Drawing Fig.

[52] U.S. Cl. .................................................... 303/35,
303/28, 303/40, 303/59
[51] Int. Cl. ...................................................... B60t 8/00,
B60t 15/12
[50] Field of Search ........................................... 303/28, 30,
32, 33, 35, 40, 60, 57, 59, 54; 137/Inq.

[56] References Cited
UNITED STATES PATENTS
2,721,104 10/1955 McClure ...................... 303/60
3,407,009 10/1968 Racki ........................... 303/35

*Primary Examiner*—Milton Buchler
*Assistant Examiner*—John J. McLaughlin, Jr.
*Attorneys*—Adelbert A. Steinmiller and Ralph W. McIntire, Jr.

ABSTRACT: A simple and inexpensive diaphragm-operated spool-type freight car brake control valve device, the initial movement of which toward an application position, in response to variations of the pressure in a brake pipe, from a release position in which one end of the spool valve is subject to atmospheric pressure thereby inhibiting operation by a slight variation of pressure in the brake pipe, effects sequentially the cutoff of said one end from atmospheric pressure and thereafter subjects it to the pressure in an auxiliary reservoir to increase the differential fluid pressure force for causing positive unseating of a spring-biased supply valve to establish a communication between the auxiliary reservoir and a brake cylinder to effect a brake application. When the spool valve is moved to a lap position upon the pressure in the auxiliary reservoir reducing slightly below that in the brake pipe as the result of flow from the auxiliary reservoir reducing slightly below that in the brake pipe as the result of flow from the auxiliary reservoir to the brake cylinder via the above-mentioned communication, a communication of limited flow capacity is established between the brake pipe and the auxiliary reservoir via the spool valve to maintain the auxiliary reservoir notwithstanding leakage therefrom.

PATENTED DEC 8 1970
3,545,820
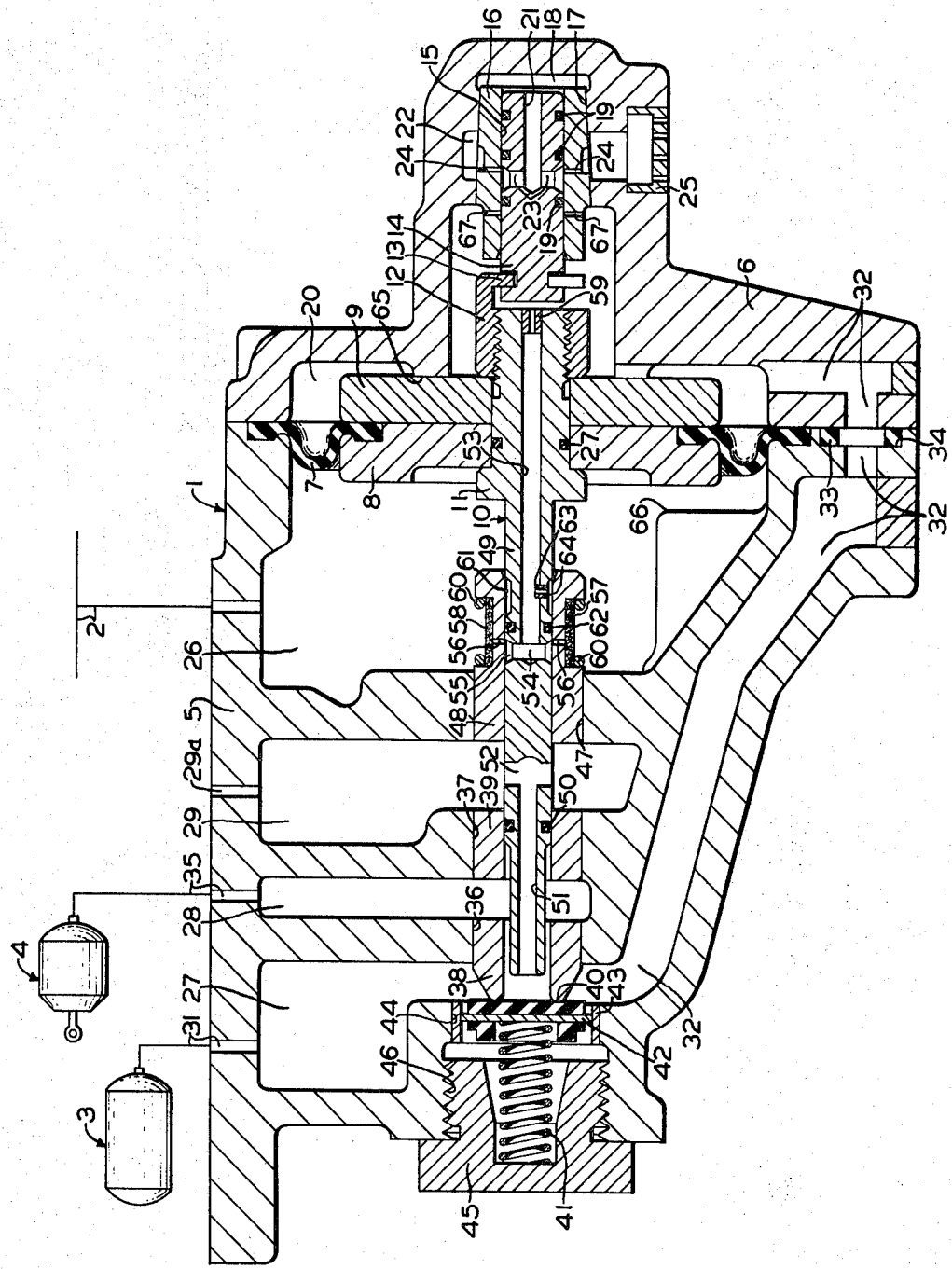
INVENTOR.
DANIEL G. SCOTT
FRED TEMPLE
BY
A. A. Steinmiller
ATTORNEY

BRAKE CONTROL VALVE

BACKGROUND OF THE INVENTION

For many years past, the captive and mining railroads that operate comparatively short trains have commonly and widely used on their freight cars a piston and ring type of brake control or triple valve device such as that shown in U.S. Pat. No. 793,979, issued Jul. 4, 1905 to John H. Bleoo. The brake control or triple valve device shown and described in this patent is a piston-type triple valve device comprising a slide valve movable by the piston relative to a slide valve seat to a service, a lap and a release position to control flow of fluid under pressure from an auxiliary reservoir to a brake cylinder to effect a brake application and the release of this fluid under pressure from the brake cylinder to atmosphere to effect a brake release. In the lap position of this slide valve, a communication is established via the slide valve through which fluid under pressure may flow from the train brake pipe to the slide valve chamber and thence to the auxiliary reservoir to maintain the pressure in the auxiliary reservoir notwithstanding leakage therefrom.

More recently, because of the low cost of manufacture and simplicity of maintenance of diaphragm-type pistons, this type of piston has been utilized to operate the valve mechanism of triple valve devices such as that disclosed in the above-mentioned Bleoo patent.

Moreover, in recent years, triple valve devices embodying a diaphragm-operated spool-type valve have found favor with American railroads because the spool-type valve is more economical to manufacture and is easier to repair.

It is the general purpose of this invention to provide an improved, novel, compact, inexpensive and simple triple valve device embodying a diaphragm-type piston that operates a spool-type valve having means for establishing in its lap position a communication of limited flow capacity through which fluid under pressure may flow from the brake pipe to the auxiliary reservoir via the spool-type valve to maintain the pressure in the auxiliary reservoir notwithstanding leakage therefrom.

SUMMARY OF THE INVENTION

According to the present invention, a novel brake control or triple valve device is provided comprising essentially a triple valve body having a bore within which is slidably mounted a spool-type valve movable to a plurality of control positions by a diaphragm-type piston. This diaphragm-type piston is subject on its respective opposite sides to the pressures in the auxiliary reservoir and in the usual train brake pipe. Upon equalization of these pressures, the diaphragm is effective to maintain the spool-type valve in a release position in which one end of this valve is subject to atmospheric pressure in a chamber formed by the cooperative relation of the one end of the valve and the cover member and open to atmosphere in this position of the valve via ports and passageways formed respectively in the valve and the cover member.

Initial movement of the spool valve from its release position towards an application position in response to a chosen reduction in the pressure in the brake pipe and effective on one side of the diaphragm, closes communication between the one end of the spool valve and atmosphere and thereafter provides for subjecting the one end of the spool valve to pressure in the auxiliary reservoir thereby increasing the operating differential fluid pressure force on the diaphragm for effecting movement of the spool-type valve which is moved thereby in the direction to effect unseating of a spring-biased supply valve to cause the flow of fluid under pressure from the auxiliary reservoir to a brake cylinder to cause a brake application. Such flow continues until the auxiliary reservoir pressure acting on one side of the diaphragm is slightly less than that of the reduced brake pipe pressure acting on the other side, whereupon the diaphragm is effective to move the spool valve to a lap position in which flow of fluid under pressure to the brake cylinder is cut off.

The spool-type valve is provided with suitable ports and passageways which, while it occupies the service application and the lap positions, establishes a communication of very limited flow capacity through which fluid under pressure may flow from the brake pipe to the auxiliary reservoir to maintain the pressure therein constant notwithstanding leakage therefrom, thereby insuring against an unwanted brake release as the result of this leakage.

In the accompanying drawing:

The single FIG. is a diagrammatic view showing a fluid pressure brake control equipment including in proportionally enlarged section a novel brake control or triple valve device constructed in accordance with the invention.

In the drawing, there is shown a brake equipment that comprises a brake control or triple valve device 1 to which is connected the usual brake pipe 2, an auxiliary reservoir 3, and a brake cylinder 4.

The triple valve device 1 comprises a casing 5 between the right-hand end of which and a cover member 6 secured to the casing 5 by any suitable means (not shown), is clamped the outer periphery of an annular diaphragm 7.

The inner periphery of the diaphragm 7 is clamped between an annular diaphragm follower 8 and an annular diaphragm follower plate 9 through which extends a screw-threaded stem integral with a spool-type valve member 10 having integral therewith a collar 11 which stem receives a special nut 12 that has screw-threaded engagement therewith whereby the diaphragm follower 8 is forced against the right-hand side of the collar 11 when this nut is tightened.

The valve member 10 is linked by means of a forked connection 13 integral with the nut 12 to the left-hand end of a second spool-type valve member 14 that is slidably mounted in a bore 15 formed in an externally tapered bushing 16 that is press-fitted into a correspondingly tapered bore 17 formed in the cover member 6 and opening at its right-hand end into a chamber 18 in this cover member 6.

Formed on the valve member 14 are three spaced-apart peripheral annular grooves in each of which is disposed an O-ring 19. Two of these O-rings 19 serve to prevent leakage of fluid under pressure from the chamber 18 to atmosphere in one position of the valve member 14, and the third prevents leakage of fluid under pressure from a chamber 20 formed by the cooperative relationship of the diaphragm 7 and cover member 6 to atmosphere while the valve member 14 occupies the position shown.

The valve member 14 is provided with a bottom bore 21 and adjacent its left-hand end this bottom bore is open to the interior of an annular chamber 22 formed in the cover member 6 via a pair of diametrically arranged short passageways 23 in the valve member 14, and a pair of diametrically arranged short passageways 24 in the bushing 16. This chamber 22 is in turn open to atmosphere via an insect excluder device 25 carried by the cover member 6.

The diaphragm 7 and the casing 5 cooperate to form on the left-hand side of this diaphragm a chamber 26 to which the hereinbefore-mentioned brake pipe 2 is connected, and in order to prevent leakage between this chamber 26 and the chamber 20, the valve member 10 on the right-hand side of the collar 11 is provided with a peripheral annular groove in which is disposed an O-ring 27 that forms a seal with the wall surface of the annular diaphragm follower 8.

Formed in the casing 5 are three chambers 27, 28 and 29. The chamber 27 is connected to the auxiliary reservoir 3 by a passageway and corresponding pipe 31 and to the chamber 20 via a passageway 32 that extends through the casing 5, a resilient annular ring 33 disposed in a counterbore 34 formed in the casing 5, and the cover member 6.

The chamber 28 is connected to the brake cylinder 4 by a passageway and corresponding pipe 35, to the chamber 27 by a bore 36 formed in the casing 5, and to the chamber 29 by a bore 37 coaxial with the bore 36 and also formed in the casing.

Press-fitted, respectively, into the bores 36 and 37 are a pair of bushings 38 and 39, the bushing 38 having formed on its left-hand end an annular valve seat 40. A spring 41, interposed between a disc-type valve 42 disposed in a bushing 43 that is press-fitted into a bore 44 formed in the casing 5 coaxial with the bore 36 and a cap nut 45 that has screw-threaded engagement with a screw-threaded bore 46 in the casing 5 and coaxial with the bore 44, serves to normally bias the disc valve 42 against the annular valve seat 40.

The hereinbefore-mentioned chambers 26 and 29 are connected by a bore 47 that is coaxial with the bores 36 and 37 and has press-fitted thereinto a bushing 48 that extends into the chamber 26. Slidably mounted in the bushings 39 and 48 is a stem 49 of the spool-type valve member 10 which stem extends in the direction of the left-hand from the collar 11.

That portion of the stem 49 that is slidably mounted in the bushing 39 is provided with a peripheral annular groove in which is disposed an O-ring 50 to prevent leakage of fluid under pressure between the chamber 28 and the chamber 29 which is open to atmosphere via a passageway 29a in the casing 5.

Extending in the direction of the right-hand from the end of the stem 49 of the spool-type valve member 10 is a counterbore 51, the right-hand end of which is connected by a cross-drilled port 52 to the chamber 29.

Extending in the direction of the left-hand from the right-hand end of the spool-type valve member 10 is a counterbore 53, the left-hand end of which is connected by a cross-drilled port 54 to a peripheral annular groove 55 provided intermediate the ends of the stem 49 and so located that, while the stem 49 occupies its release position shown, this groove is in communication with a pair of diametrically opposite ports 56 provided in the bushing 48 and at their outer ends open at the peripheral surface of an elongated peripheral annular groove 57 formed on the bushing 48.

Disposed about the peripheral annular groove 57 is a piece of felt 58 that constitutes a filter for removing contaminants from fluid under pressure flowing from the chamber 26 to the chamber 20 via ports 56, groove 55 on stem 49, cross-drilled port 54, counterbore 53 in valve member 10, and a charging choke 59 press-fitted into the end of the counterbore 53. The length of the felt 58 is substantially the same as that of the groove 57 on the bushing 48 to which this felt is secured by a pair of wire bands 60 one disposed about each end of the felt.

In order to maintain a constant pressure in the auxiliary reservoir 3 and the chamber 20 against leakage of fluid under pressure therefrom, while the spool-type valve member 10 occupies its service application and lap positions respectively, the stem 49, intermediate the peripheral annular groove 55 and the collar 11, is provided with an elongated peripheral annular groove 61, and between this elongated groove 61 and the peripheral annular groove 55, this stem 49 is provided with another peripheral annular groove in which is disposed an O-ring 62 that forms a seal with the wall surface of the bushing 48 to prevent leakage of fluid under pressure along the peripheral surface of the stem 49 between the grooves 55 and 61 thereon.

Opening at the surface of the elongated peripheral annular groove 61 intermediate the ends thereof is one end of a bore 63 that extends through the stem 49 and opens at its opposite end at the interior wall surface of the counterbore 53. A chock 64 which, for example, may be .009 inch in diameter, is press-fitted into the bore 63 the size of which choke determines the rate of flow of fluid under pressure from the brake pipe to the auxiliary reservoir 3 while the spool-type valve occupies its service application and lap positions.

To charge the equipment, fluid under pressure is supplied to the brake pipe 2 in the usual manner and flows therefrom to the chamber 26 in the brake control valve device 1. Assuming that the valve member 10 occupies its release position in which it is shown in the drawing, fluid under pressure will flow from the chamber 26 to the chamber 20 via the felt filter 58, ports 56, groove 55, cross-drilled port 54, counterbore 53 and charging choke 59. It will be noted that at this time the chamber 18 is open to atmosphere via bottom bore 21, short passageways 23 and 24, annular chamber 22 and insect excluder device 25 thereby subjecting the right-hand end of the spool-type valve member 14 to atmospheric pressure. Also, it can be seen from the drawing that the diameter of the valve member 14 is greater than the diameter of the stem 49. Accordingly, it will be apparent that the fluid pressure force resulting from the fluid under pressure present in the chamber 26 and acting over the effective area of the left-hand side of the diaphragm 7 slightly exceeds the fluid pressure force resulting from the fluid under pressure present in the chamber 20 and acting over the effective area of the right-hand side of this diaphragm. Consequently, this greater fluid pressure force is effective to maintain the diaphragm follower plate 9 against a stop 65 formed on the cover member 6 and a release spring is not necessary to maintain the spool valves 10 and 14 in their release position in which they are shown in the drawing.

Moreover, this greater fluid pressure force acting on the left-hand side of the diaphragm 7 prevents an undesirable brake application upon the occurrence of a slight reduction of the pressure in the chamber 26 as the result of minor fluctuations of the pressure in the brake pipe 2.

Fluid under pressure supplied from the brake pipe 2 to the chamber 20 in the manner described above flows from this chamber to the auxiliary reservoir 3 via passageway 32, annular ring 33, chamber 27 and passageway and corresponding pipe 31 thereby charging the auxiliary reservoir 3 to the pressure normally carried in the brake pipe 2.

With the parts of the control valve device 1 in their release position, the brake cylinder 4 is connected to atmosphere via pipe and passageway 35, chamber 28, the interior of bushing 38, counterbore 51, port 52, chamber 29 and passageway 29a.

When it is desired to effect a service application of the brakes, the brake pipe pressure is reduced at a service rate in the usual manner through the medium of the engineer's brake valve device (not shown). This brake pipe reduction causes a corresponding reduction of pressure to be effected in the chamber 26 of the brake control valve device 1.

When the pressure in the chamber 26 is thus reduced, fluid under pressure flows from the chamber 20 to the chamber 26 at a restricted rate via the choke 59, counterbore 53, port 54, groove 55, ports 56, and felt strainer 58. The choke 59 thus causes the pressure in the chamber 20 to quickly exceed the pressure in the chamber 26, thereby establishing a fluid pressure differential force which acts in the direction to deflect the diaphragm 7 in the direction of the left-hand, as viewed in the drawing, and thereby cause the valve members 10 and 14 to be moved in the direction of the left-hand until the diaphragm follower 8 abuts a stop rib 66 integral with the casing 5.

As the valve member 10 is thus moved in the direction of the left-hand, the O-ring 62 carried by the stem 49 of valve member 10 is moved to a position in which this O-ring forms a seal with the wall surface of the bushing 48 at a location at the left-hand side of the opening of the ports 56 at this wall surface. Thus, the communication through which the auxiliary reservoir 3 is normally charged from the brake pipe 2 is closed.

The length of the stem 49 is such that the left-hand O-ring 19 carried by the valve member 14 will be moved to a position at the left-hand side of the openings of a pair of diametrically arranged short passageways 67 provided in the bushing 16 just prior to movement of the left-hand end of the stem 49 into abutting relationship with the right-hand side of the disc valve 42 to close communication between the brake cylinder 4 and atmosphere via pipe and passageway 35, chamber 28, bushing 38, counterbore 51, port 52, chamber 29 and passageway 29a. Likewise, the intermediate O-ring 19 carried by the valve member 14 will be moved to a position at the left-hand side of the openings of the pair of short passageways 24 in the bushing 16 just prior to movement of the left-hand end of the stem 49 into abutting relationship with the disc valve 42.

When the intermediate O-ring 19 is moved to the position at the left-hand side of the openings of the passageways 24, communication between chamber 18 and atmosphere is closed via bottom bore 21, short passageways 23 and 24, chamber 22 and insect excluder device 25. Furthermore, when the left-hand O-ring 19 is moved to the position at the left-hand side of the openings of the passageways 67, a communication is established between the chamber 20 and the chamber 18 via the pair of short passageways 67 in the bushing 16, the pair of short passageways 23 in the valve member 14, and bottom bore 21. Accordingly, upon the establishment of this communication, fluid under pressure flows from the chamber 20 and the auxiliary reservoir 3 connected thereto, to the chamber 18.

Fluid under pressure thus supplied to the chamber 18 is immediately effective on the area of the spool-type valve member 14 to establish a fluid pressure force that acts in the direction of the left-hand. This force now acts in conjunction with the fluid pressure force acting on the effective area of the diaphragm 7 and thereby increases the force effective to unseat the valve 42 from its seat 40 against the yielding resistance of the spring 41 just subsequent to movement of the left-hand end of the stem 49 into abutting relationship with the disc valve 42. It can be understood that the strength of the spring 41 and the area of the end of the valve member 14 can be so selected that the fluid pressure force established upon the supply of fluid under pressure from the chamber 20 and the auxiliary reservoir 3 to the chamber 18 in the manner described above, is just sufficient to overcome the yielding resistance of the spring 41.

Subsequent to movement of the left-hand end of the stem 49 into abutting relationship with the disc valve 42, further deflection of the diaphragm 7 in the direction of the left-hand causes the valve members 14 and 10 to move in the same direction so that the stem 49 effects unseating of the disc valve 42 from its seat 40.

Upon the unseating of the valve 42 from its seat 40, fluid under pressure will flow from the auxiliary reservoir 3 and the chamber 20 connected thereto to the pressure chamber (not shown) in the brake cylinder 4 via pipe and passageway 31, chamber 27, past unseated valve 42, interior of bushing 38, chamber 28 and passageway and pipe 35. Consequently, the brake cylinder 4 is effective in response to the supply of fluid under pressure to the pressure chamber thereof to effect a brake application on the car.

It should be noted that when the stem 49 is moved far enough in the direction of the left-hand for the end of this stem 49 to abut valve 42, the O-ring 62 carried on this stem 49 is moved from the position shown to a position in which it forms a seal with the wall surface of the bushing 48 at a location that is at the left-hand side of the opening of the ports 56 at this wall surface. Accordingly, it will be understood that in the service position of the valve member 10 in which valve 42 is unseated from its seat 40, fluid under pressure flows from the brake pipe 2 to the auxiliary reservoir 3 at a controlled rate determined by the size of the choke 64 and also the size of the choke 59 via chamber 26, filter 58, ports 56, groove 61 on stem 49, choke 64, counterbore 53, choke 59, chamber 20, passageway 32, chamber 27, and passageway and pipe 31.

The fluid under pressure supplied to the auxiliary reservoir 3 at a controlled rate determined by the size of choke 64 maintains the pressure in this reservoir against leakage therefrom so long as the rate of leakage from this reservoir does not exceed the capacity of choke 64. This constitutes an auxiliary reservoir pressure maintaining feature that is effective while the valve member 10 is in the service application position to prevent an undesired release of the brakes due to auxiliary reservoir leakage.

It is apparent that fluid under pressure cannot flow from the brake pipe 2 to the auxiliary reservoir 3 via the chokes 64 and 59 as fast as fluid under pressure flows from the auxiliary reservoir 3 and chamber 20 to the brake cylinder 4.

When, for any given reduction in brake pipe pressure, the auxiliary reservoir pressure and the pressure in chamber 20 reduces, by flow of fluid to the brake cylinder 4, to slightly below that of the brake pipe pressure in chamber 26, the diaphragm 7 is deflected in the direction of the right-hand to thereby move the valve members 10 and 14 in the direction of the right-hand. As the valve member 10 and its stem 49 are thus moved in the direction of the right-hand, the spring 41 is rendered effective to move the valve 42 towards the seat 40. Consequently, deflection of the diaphragm 7 is effective to move the valve member 10 and its stem 49 in the direction of the right-hand to a lap position in which the spring 41 seats the valve 42 on the seat 40, it being remembered that the valve 42 abuts the left-hand end of the stem 49 at this time.

This seating of the valve 42 on its seat 40 is effective to cut off the flow of fluid under pressure from the auxiliary reservoir 3 to the brake cylinder 4.

It should be noted that the location of the O-ring 62 on the stem 49 is such that when this stem 49 and the valve members 10 and 14 reach the lap position described above, this O-ring 62 makes a seal with the wall surface of the bushing 48 at a location at the left-hand side of the opening of the ports 56 at this wall surface. However, it will be understood that the seal thus formed by the O-ring 62 at this time is closer to the opening of the ports 56 at the wall surface of the bushing 48 than was the case while the stem 49 and valve member 10 occupied the service application position.

In view of the above, it will be understood that in the lap position of the valve member 10, fluid under pressure flows from the brake pipe 2 to the auxiliary reservoir 3 at a controlled rate via the same pathway hereinbefore described for the service application position of the valve member 10. The fluid under pressure thus supplied to the auxiliary reservoir 3 at a controlled rate maintains the pressure in the auxiliary reservoir 3 against leakage so long as the rate of leakage from the auxiliary reservoir does not exceed the capacity of the choke 64. This constitutes an auxiliary reservoir pressure maintaining feature that is effective while the brakes are applied to prevent an undersired undesired release of the brakes due to auxiliary reservoir leakage.

If, after a limited application of the brakes has been effected, it is desired to increase the brake cylinder pressure, a further reduction in brake pipe pressure is effected through the medium of the brake valve device on the locomotive which causes the diaphragm 7 to be deflected in the direction of the left-hand to shift the valve members 10 and 14 from their lap position to their service application position and unseat the valve 42 from its seat 40 so that fluid under pressure again flows from the auxiliary reservoir 3 to the brake cylinder device 4. This flow will continue until the pressure in the auxiliary reservoir 3 and chamber 20 is reduced enough to cause the valve members 10 and 14 to return to lap position in the manner hereinbefore described. Thus, it is possible to obtain the service braking pressure up to full service (or equalization between auxiliary reservoir and brake cylinder) in a series of small increments or stages.

To effect a release of the brakes after an application, fluid under pressure is supplied to the brake pipe 2 from the usual brake valve on the locomotive and flows from the brake pipe 2 to the chamber 26 in the brake control valve device 4 in the same manner as has before been described in connection with the initial charging of the equipment.

The rapid increase in brake pipe pressure in the chamber 26, by reason of the chokes 64 and 59 creates a pressure differential on the diaphragm 7 which causes this diaphragm to deflect in the direction of the right hand to move the valve members 10 and 14 in this same direction.

As the valve members 10 and 14 are thus moved in the direction of the right-hand the end of the stem 49 is moved away from the valve 42 which is now biased against the supply valve seat 40 by the spring 41. Upon movement of the end of the stem 49 away from the valve 42, fluid under pressure is completely released from the brake cylinder 4 to atmosphere via pipe and passageway 35, chamber 28, interior of bushing 38, counterbore 51, port 52, chamber 29 and passageway 29a.

Subsequent to movement of the end of the stem 49 of the valve member 10 away from the valve 42, and prior to the valve member 14 reaching the position shown in the drawing, the left-hand O-ring 19 carried by this valve member is moved to a position in which it forms a seal with the wall surface of the bushing 16 at a location at the right-hand side of the opening of the short passageways 67 at the wall surface of this bushing 16, thereby closing communication between the chambers 20 18.

Likewise, the intermediate O-ring 19 carried by the valve member 14 is moved to a position in which it forms a seal with the wall surface of the bushing 16 at a location at the right-hand side of the opening of the short passageways 24 at the wall surface of this bushing 16 thus establishing a communication between the chamber 18 and atmosphere via bottom bore 21, short passageways 23 and 24, chamber 22 and insect excluder device 25. When communication between the chamber 18 and atmosphere is thus established, the fluid under pressure present in the chamber 18 is completely vented to atmosphere so that thereafter the right-hand end of the valve member 14 is subject only to atmospheric pressure. By thus releasing the fluid under pressure from the chamber 18 and thereafter subjecting the right-hand end of the valve member 14 to only atmospheric pressure prior to this valve member reaching its release position, the fluid under pressure supplied from the brake pipe 2 to the chamber 26 is rendered effective as it acts on the left-hand side of the diaphragm 7 over the effective area thereof to deflect this diaphragm in the direction of the right-hand until the diaphragm follower plate 9 abuts the stop 65 and the valve members 10 and 14 reach their release position; it being noted that the choke 59 restricts the flow of fluid under pressure to the chamber 20 so that the pressure therein cannot increase to the value of the pressure in the chamber 26 prior to the diaphragm follower plate 9 abutting the stop 65 and the valve members 10 and 14 reaching their release position in which they are shown in the drawing.

We claim:

1. In a fluid pressure brake system of the type comprising a brake pipe normally charged to a certain chosen pressure, a brake cylinder, an auxiliary reservoir charged to said chosen pressure, and a brake control valve device comprising a movable abutment subject on its opposite sides respectively to the pressure in the brake pipe and the auxiliary reservoir, and a supply valve operative by movement of the movable abutment responsively to reduction of brake pipe pressure from its chosen pressure for controlling flow of fluid under pressure from the auxiliary reservoir to the brake cylinder, wherein the improvement comprises:
   a. a pair of coaxially arranged spool-type valves operably connected to said movable abutment, one of which has means for effecting normal charging of the auxiliary reservoir and the release of fluid under pressure from the brake cylinder to atmosphere, the initial movement of the other of which upon movement of both responsively to reduction of brake pipe pressure from its chosen pressure from a release position in which one end of the other is subject to atmospheric pressure effects sequentially the cut off of said one end from atmospheric pressure and thereafter the subjecting of it to a higher pressure to increase the differential fluid pressure force on said abutment for causing the movement thereby of the one spool-type valve to sequentially positively cut off normal charging of the auxiliary reservoir, close communication between the brake cylinder and atmosphere, and effect movement of said supply valve to an open position to cause flow of fluid under pressure from the auxiliary reservoir to the brake cylinder to effect a brake application until the pressure in the auxiliary reservoir is reduced to substantially the reduced pressure in the brake pipe whereupon said movable abutment moves said pair of spool-type valves to a lap position in which said supply valve is closed, and
   b. means provided in said one spool-type valve for, while in its lap position, establishing a communication between the brake pipe and the auxiliary reservoir to maintain the auxiliary reservoir notwithstanding leakage therefrom.

2. In a fluid pressure brake system of the type comprising a brake pipe normally charged to a certain chosen pressure, a brake cylinder, an auxiliary reservoir charged to said chosen pressure, and a brake control valve device comprising a movable abutment subject on its opposite sides respectively to the pressure in the brake pipe and the auxiliary reservoir, and a supply valve operative by movement of the movable abutment responsively to reduction of brake pipe pressure from its chosen pressure for controlling flow of fluid under pressure from the auxiliary reservoir to the brake cylinder, wherein the improvement comprises:
   a. a pair of coaxially arranged spool-type valves operably connected to said movable abutment, one of which has means for effecting normal charging of the auxiliary reservoir and the release of fluid under pressure from the brake cylinder to atmosphere, the initial movement of the other of which upon movement of both responsively to reduction of brake pipe pressure from its chosen pressure from a release position in which one end of the other is subject to atmospheric pressure effects sequentially the cut off of said one end from atmospheric pressure and thereafter the subjecting of it to a higher pressure to increase the differential fluid pressure force on said abutment for causing the movement thereby of the one spool-type valve to sequentially positively cut off normal charging of the auxiliary reservoir, close communication between the brake cylinder and atmosphere, and effect movement of said supply valve to an open position to cause flow of fluid under pressure from the auxiliary reservoir to the brake cylinder to effect a brake application until the pressure in the auxiliary reservoir is reduced to substantially the reduced pressure in the brake pipe whereupon said movable abutment moves said pair of spool-type valves to a lap position in which said supply valve is closed, and
   b. means provided in said one spool-type valve for, while in the position in which said supply valve is in its open position and also for while in its lap position in which said supply valve is closed, establishing a communication between the brake pipe and the auxiliary reservoir to maintain the auxiliary reservoir notwithstanding leakage therefrom.

3. A brake control valve device, as claimed in claim 1, further characterized in that the other of said spool-type valves, upon simultaneous movement of said pair of spool-type valves from said lap position toward said release position in response to an increase in the pressure in the brake pipe, is effective prior to reaching said release position to release said higher pressure from said one end and thereafter subject said one end to atmospheric pressure whereby both of said spool-type valves are positively moved to their release position.

4. In a fluid pressure brake system of the type comprising a brake pipe normally charged to a certain chosen pressure, a brake cylinder, an auxiliary reservoir charged to said chosen pressure, and a brake control valve device comprising a movable abutment subject on its opposite sides respectively to the pressure in the brake pipe and the auxiliary reservoir, and a supply valve operative by movement of the movable abutment responsively to reduction of brake pipe pressure from its chosen pressure for controlling flow of fluid under pressure from the auxiliary reservoir to the brake cylinder, wherein the improvement comprises:
   a. a pair of coaxially arranged spool-type valves operably connected to said movable abutment, one of which has means for effecting normal charging of the auxiliary reservoir and the release of fluid under pressure from the brake cylinder to atmosphere, the initial movement of the other of which upon movement of both responsively to reduction of brake pipe pressure from its chosen pressure from a release position in which one end of the other is subject to atmospheric pressure effects sequentially the cut off of said one end from atmospheric pressure and thereafter the subjecting of it to auxiliary reservoir pressure to increase the differential fluid pressure force on said abutment for causing the movement thereby of the one spool-type valve to sequentially positively cut off normal charging of the auxiliary reservoir, close communication between the brake cylinder and atmosphere and effect movement of said supply valve to an open position to cause flow of fluid under pressure from the auxiliary reservoir to the brake cylinder to effect a brake application until the pressure in the auxiliary reservoir is reduced to substantially the reduced pressure in the brake pipe whereupon said movable abutment moves said pair of spool-type valves to a lap position in which said supply valve is closed, and b. means provided in said one spool-type valve for, while in its lap position, establishing a communication between the brake pipe and the auxiliary reservoir to maintain pressure in the auxiliary reservoir notwithstanding leakage therefrom.

5. A fluid pressure operated type valve device comprising a movable abutment subject on its opposite sides respectively to a control pressure and a second pressure variable in accordance with variations in said control pressure, and a supply valve operative by movement of the movable abutment responsively to reduction of said control pressure from an established pressure for supplying fluid under pressure to a device to be operated thereby, wherein the improvement comprises:

a. a pair of coaxially arranged spool-type valves disposed on the respective opposite sides of said movable abutment and operably connected thereto, one of which is effective to operate said supply valve to cause the supply of fluid under pressure to said device and to subsequently effect release of fluid under pressure from said device to atmosphere, the initial movement of the other of which upon movement of both from one position in which one end of the other is subject to atmospheric pressure effect sequentially the cut off of said one end from atmospheric pressure and thereafter subjecting it to a higher pressure to increase the differential fluid pressure force on said abutment for causing simultaneous movement thereby of both of said spool-type valves in the direction to cause said one spool-type valve to positively operate said supply valve to its fluid pressure supplying position until said second pressure acting on one side of said movable abutment is slightly less than said reduced control pressure acting on the other side of said abutment whereupon said abutment moves said pair of spool-type valves to a lap position in which said supply valve is closed, and b. means provided in said one spool-type valve for, while in its lap position, establishing a restricted communication between the opposite sides of said abutment whereby said second pressure is maintained substantially equal to said reduced control pressure.

6. A valve device, as claimed in claim 5, further characterized in that said means provided in said one spool-type valve is also effective, while said one spool-type is in the position in which it operates said supply valve to its fluid pressure supplying position, to establish a restricted communication between the opposite sides of said abutment.

7. A valve device, as claimed in claim 5, further characterized in that the other of said spool-type valves, upon simultaneous movement of said pair of spool-type valves from said lap position toward said one position in response to an increase in said control pressure, is effective, prior to reaching said one position, to release said higher pressure from said one end and thereafter subject said one end to atmospheric pressure whereby both of said spool-type valves are positively moved to their release position.

8. A fluid pressure operated type valve device comprising a movable abutment subject on its opposite sides respectively to a control pressure and a second pressure variable in accordance with variations in said control pressure, and a supply valve operative by movement of the movable abutment responsively to reduction of said control pressure from a chosen pressure for supplying fluid under pressure to a device to be operated thereby, wherein the improvement comprises:

a. a pair of coaxially arranged hollow spool-type valves disposed on the respective opposite sides of said movable abutment and operably connected thereto, one of which is effective to operate said supply valve to cause the supply of fluid under pressure to said device and to subsequently effect release of fluid under pressure from said device to atmosphere, the initial movement of the other of which upon movement of both from one position in which one end of the other is subject to atmospheric pressure effects sequentially the cut off of said one end from atmospheric pressure and thereafter the subjecting of it to said second pressure to increase the differential fluid pressure force on said abutment for causing simultaneous movement thereby of both of said spool-type valves in the direction to cause said one spool-type valve to positively operate said supply valve to its fluid pressure supplying position until said second pressure acting on one side of said movable abutment is slightly less than said reduced control pressure acting on the other side of said abutment whereupon said abutment moves said pair of spool-type valves to a lap position in which said supply valve is closed, and b. means provided in said one spool-type valve for, while in its lap position, establishing a restricted communication between the opposite sides of said abutment whereby said second pressure is maintained substantially equal to said reduced control pressure.